Figure 1:
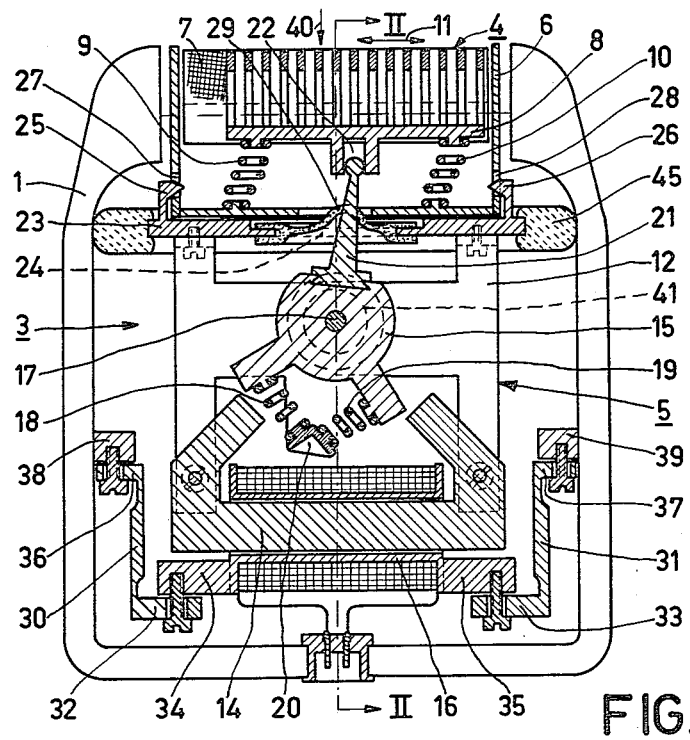

United States Patent [19]

Bukoschek

[11] 4,240,200
[45] Dec. 23, 1980

[54] DRYSHAVING APPARATUS

[75] Inventor: Romuald L. Bukoschek, Klagenfurt, Austria

[73] Assignee: U.S. Philips Corporation, New York, N.Y.

[21] Appl. No.: 10,271

[22] Filed: Feb. 7, 1979

[30] Foreign Application Priority Data

Feb. 10, 1978 [AT] Austria .................................. 970/78

[51] Int. Cl.³ .................................................. B26B 19/02
[52] U.S. Cl. ............................................................ 30/43.92
[58] Field of Search ..................... 30/42, 43.91, 43.92; 173/162 R; 188/1 B; 310/29

[56] References Cited

U.S. PATENT DOCUMENTS

| | | | |
|---|---|---|---|
| 2,565,697 | 8/1951 | Odstroil | 310/29 |
| 2,986,662 | 5/1961 | Wahl | 310/29 |
| 3,076,108 | 1/1963 | Oliver | 30/43.92 |
| 3,077,663 | 2/1963 | Tann | 30/34 B |
| 3,521,093 | 7/1970 | Harms | 30/43.92 X |
| 3,555,676 | 1/1971 | Bauer | 30/43.92 |
| 3,898,732 | 8/1975 | Krainer | 30/43.92 |
| 3,906,263 | 9/1975 | Chen | 30/43.92 |
| 3,946,486 | 3/1976 | Locke | 30/43.92 |
| 3,962,783 | 6/1976 | Rentema | 30/43.92 X |
| 4,030,573 | 6/1977 | Buzzi | 30/43.92 |
| 4,065,977 | 1/1978 | Buzzi | 30/43.92 X |

FOREIGN PATENT DOCUMENTS 545885 6/1942 United Kingdom .
625419 6/1949 United Kingdom .

Primary Examiner—Gary L. Smith
Attorney, Agent, or Firm—Thomas A. Briody; William J. Streeter; Rolf E. Schneider

[57] ABSTRACT

A dryshaving apparatus in which a shaving head and an oscillating-armature motor constitute an assembly. This assembly is mounted in the housing of the dryshaving apparatus by elastic elements only, at least one elastic element being a strip-shaped integral hinge extending transversely to the oscillating movement and connected at one end to the assembly and at its other end to the housing. The assembly together with the elastic elements has a mechanical resonant frequency less than the oscillation frequency, divided by $\sqrt{2}$, of the parts of the assembly performing the oscillating movement.

5 Claims, 3 Drawing Figures

U.S. Patent    Dec. 23, 1980    Sheet 2 of 2    4,240,200

DRYSHAVING APPARATUS

This invention relates to a dryshaving apparatus having a shaving head which comprises a lower cutter, which performs a reciprocatory oscillating movement and which cooperates with a stationary upper cutter, which lower cutter is adapted to be driven by means of an oscillating-armature motor, the shaving head and the oscillating-armature motor constituting an assembly, which is mounted in a housing by means of elastic elements only. Such a dryshaving apparatus is described in British Pat. No. 625 419; in the known dryshaving apparatus said assembly is mounted in the housing by means of a plurality of elastic buffers.

It is a known fact that the user of a dryshaving apparatus driven by an oscillating-armature motor will notice a certain vibration of the apparatus because the mass forces caused by the apparatus parts which perform a reciprocatory oscillating movement are partly transferred to the housing. Such vibration is generally experienced as annoying, for which reason it is attempted to to minimize said vibration. However, in practice this requirement can only be satisfied to a limited extent, because for mounting the parts which perform a reciprocatory oscillating movement in the housing some connection is necessary between these parts and the housing, via which connection the vibrations are then transmitted to a greater or less extent.

In order to reduce such vibrations steps may be applied which are known from other fields of technology for the isolation of vibrations. In a dryshaving apparatus of the above-mentioned type the vibration system specifically comprises two coupled masses, of which the one mass is constituted by the assembly formed by the shaving head and the oscillating-armature motor and the other mass by the housing and the hand of the user of the dryshaving apparatus. The coupling between these two masses is then constituted by the elastic elements, which establish the connection between the assembly and the housing. Such a vibration system may be calculated, enabling the requirements to be imposed on the elastic elements in order to obtain a suitable isolation the vibratitons between the two masses. It is then found that for higher frequencies, which are the main cause for the noise produced by the apparatus, an effective isolation of vibrations can be realized in a comparatively simple manner, because elastic elements which are rigid enough, such as for example rubber buffers, are satisfactory for this purpose. However, isolating vibrations of lower frequencies, which are the main cause of the annoying vibrations, demands the use of particularly non-rigid elastic elements with a low damping. However, realizing such elements presents problems in the case of a dryshaving apparatus, because in this case a series of other requirements should also be satisfied. These include inter alia that such apparatus should be of a comparatively compact construction, and also that allowance is to be made for the pressure on the shaving head during shaving, which via the assembly is transmitted to the elastic elements and which should consequently be taken up by said elements in order to ensure that the shaving head is not deflected under the shaving pressure. This last-mentioned requirement means that the elastic elements should be of comparatively rigid design, which is contradictory to the requirement for a satisfactory suppression of vibrations.

It is the object of the present invention to avoid the said problems in a simple manner and to propose steps which ensure both a satisfactory isolation of vibrations and an accurate mounting of the assembly constituted by the shaving head and the oscillating-armature motor in the housing.

According to the invention this object is achieved in that in a dryshaving apparatus of the above-mentioned type at least one of the elastic elements is constituted by a strip-shaped integral hinge which extends transversely to the oscillating movement, which hinge is connected at one end to the assembly and at its other end to the housing, the assembly together with the elastic elements having a mechanical resonant frequency less than the oscillation frequency, divided by $\sqrt{2}$, of the parts of the assembly which perform the reciprocatory oscillating movement.

In this respect it is to be noted that the use of strip-shaped integral hinges for mounting movable parts is known. As an example U.S. Pat. No. 4,065,977 describes appliances driven by an electric motor, inter alia a dryshaving apparatus, in which strip-shaped integral hinges are used for obtaining a most accurate parallel guidance of a reciprocatory apparatus part. However, these strip-shaped integral hinges are not used for isolating vibrations.

In a dryshaving apparatus, in which there is provided at least one cylindrical elastic element between the housing and each of the two confronting sides of the assembly which extend parallel to the oscillating movement, it is advisable in order to have a very simple construction, to provide at least one strip-shaped integral hinge between the housing and each of the two confronting sides of the assembly which extend transversely to the oscillating movement, which integral hinge at the end which engages with the assembly is connected to that end of the oscillating-armature motor which is remote from the shaving head, and to have each of the cylindrical elastic elements provided between the housing and one of the two confronting sides of the assembly which extend parallel to the plane of the oscillating movement, engage with the end of the oscillating-armature motor which faces the shaving head. In this respect it is furthermore found to be advantageous if between the housing and each of the two confronting sides of the assembly which extend transversely to the oscillating movement there is provided only one strip-shaped integral hinge, which extends with its longitudinal axis essentially parallel to the direction of the connection between the shaving head and the oscillating-armature motor.

A very good vibration system is also obtained if between the housing and each of the two confronting sides of the assembly which extend transversely to the oscillating movement there are provided at least two strip-shaped integral hinges, which extend with their longitudinal axes essentially parallel to the direction of the connection between the shaving head and the oscillating-armature motor and which are oriented oppositely to each other relative to said direction.

For a particularly simple construction it is also found to be effective if at the end which engages with the assembly the strip-shaped integral hinge is articulated to a coil former which carries an exciter coil for the oscillating-armature motor.

Figure 2:
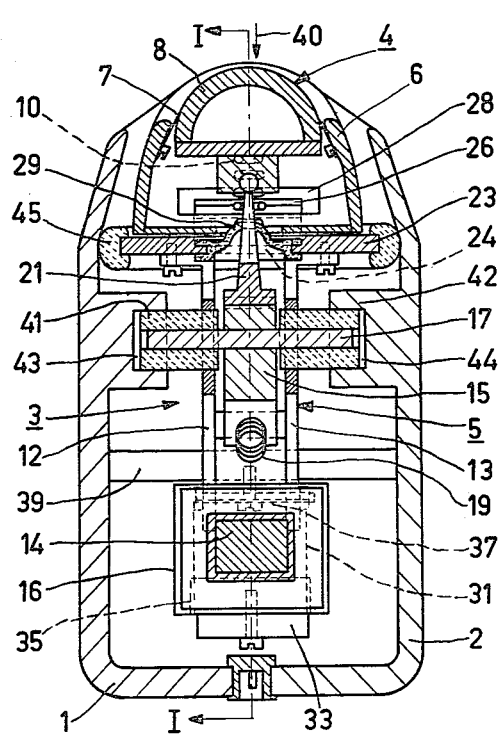
Figure 3:
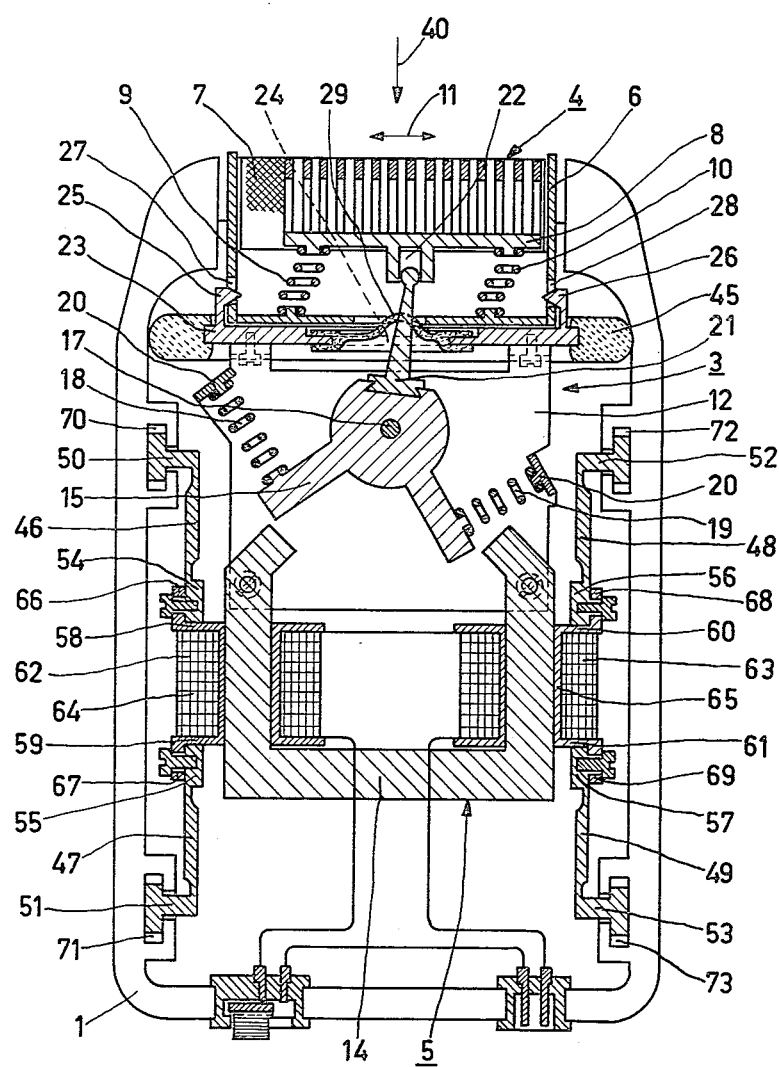

The invention will now be described with reference to the accompanying drawings, in which: FIG. 1 is a cross-section parallel to the plane of oscillation, taken on the line I—I in FIG. 2, and shows a dryshaving apparatus whose assembly is mounted in a housing with two cylindrical elastic elements and two strip-shaped integral hinges. FIG. 2 is a cross-section taken on the line II—II in FIG. 1. FIG. 3, also in a cross-section parallel to the plane of oscillation, shows a dryshaving apparatus in which the assembly is mounted in the housing by means of four strip-shaped hinges.

In FIGS. 1 and 2 the two housing halves of a dryshaving apparatus and designated 1 and 2 the two housing halves of a dryshaving apparatus are designated 1 and 2, which together accommodate an assembly 3 which essentially comprises a shaving head 4 and an oscillating-armature motor 5. The shaving head 4 comprises a shaving head support 6, which carries a stationary upper cutter 7, which in the present case is constituted by an arcuate shear foil. This upper cutter 7 cooperates with a lower cutter 8, which is urged against the upper cutter by means of two springs 9 and 10, which at one end bear against the lower cutter and at the other end against the support 6. The lower cutter 8, as is indicated by the double arrow 11, performs a reciprocatory oscillating movement, for which purpose it is driven by the oscillating-armature motor 5.

The oscillating-armature motor 5 in its turn has a support comprising two plate-shaped parts 12 and 13, on which both a stator 14 and an oscillating-armature 15 are arranged. The stator 14 is provided with a coil former 16 which carries an exciter coil. The oscillating armature 15 is pivotally journalled on a spindle 17 which extends perpendicularly to the two plate-shaped parts 12 and 13 of the support, which is connected to said support and which cooperates with two springs 18 and 19, which in their turn bear against a projection 20 of each support 12, 13. To the oscillating armature 15 an oscillating armature lever 21 is connected whose free end engages with a slot 22 formed in the lower cutter 8, so that the movement of the oscillating armature is transmitted to the lower cutter in the usual manner.

Furthermore, a plate 23 is connected to the supports 12, 13 of the oscillating-armature motor 5, which plate has an opening 24 through which the oscillating-armature lever 21 extends. Hook-shaped projections 25 and 26 are formed on said plate 23, which serve for retaining the shaving head 4, for which purpose they engage with corresponding openings 27 and 28 in the shaving head support 6. Thus the shaving head 4 and the oscillating-armature motor 5 constitute an assembly, from which the shaving head 4 is detachable, for example for cleaning purposes. Between the oscillating-armature lever 21 and the plate 23 there is furthermore provided an elastic dust seal 29.

As the assembly 3 comprises parts, both in the oscillating-armature motor 5 and in the shaving head 4, which perform a reciprocatory oscillating movement, it is not unlikely that via the mounting of the assembly 3 in the housing 1,2 this oscillating movement is also partly transmitted thereto and manifests itself as an annoying vibration of the housing. In order to avoid this vibration, as far as possible, the assembly 3 is mounted in the housing 1,2 of the dryshaving apparatus in known manner by elastic elements only, which at one end bear against the assembly 3 and at the other end against the two housing halves 1 and 2. Only if this requirement is met is it possible to obtain a suitable isolation of vibrations, because any rigid connection between the assembly and the housing would constitute a rigid coupling between these parts, which would obviously transmit the vibrations of the assembly to the housing. In order to determine how the elastic elements for mounting the assembly 3 in the housing 1,2 should be constructed, similar theories are applied as known from the technology of isolating vibrations. From these theories it follows that the assembly 3 represents a mass m, which via a resilient coupling with the spring constant C constituted by the elastic elements is connected to a mass M, which is constituted by the housing 1,2 and the hand of the user of the dryshaving apparatus. For such a vibration system the mechanical resonant frequency $f_o$ may be calculated in accordance with the formula $$f_o = \frac{1}{2\pi} \sqrt{C\left(\frac{1}{m} + \frac{1}{M}\right)}$$

In practice the influence of the mass M is then negligible, because it is substantially greater than the mass m of the assembly 3. Furthermore depending on the frequency of the exciting force, the transmission factor at this frequency from the mass m to the mass M may be calculated in known manner, yielding resonance curves which below the frequency $f_o \cdot \sqrt{2}$ exhibit a range of increased vibrations and above said frequency a range of reduced vibrations, i.e. isolation of the vibrations. The strength of the resonance and the degree of isolation of the vibrations then depend on the damping of the vibration system. It follows that in order to obtain an isolation of vibrations the assembly 3 together with the elastic elements should exhibit a mechanical resonant frequency which is less than the oscillation frequency, divided by $\sqrt{2}$, of the oscillating parts of the assembly. As the mechanical resonant frequency decreases relative to the oscillation frequency divided by $\sqrt{2}$, the isolation of vibrations improves. In practice it has been found that a very good isolation of vibrations is obtained if the mechanical resonant frequency is, for example, one fifth of the oscillation frequency, because in this case already substantially 95% of the exciting force is absorbed. The oscillation frequency of the oscillating parts of the assembly 3 is essentially fixed, because such dryshaving apparatus normally operates on alternating current voltage, so that the said oscillation frequency is either equal to the line frequency or equal to twice the line frequency, depending on whether the oscillating-armature motor 5 employs one or both half cycles of the alternating voltage for its excitation. Furthermore care must be taken that the damping of the elastic elements is minimized, because this also promotes the proper isolation of the vibrations.

From the requirement that for a satisfactory isolation of vibrations the mechanical resonant frequency of the vibration system should be low relative to the oscillation frequency divided by $\sqrt{2}$ it follows because of the comparatively low oscillation frequency and for a given mass m of the assembly 3, that the elastic elements should have a very small spring constant and should therefore be as non-rigid as possible. Conversely, there is the requirement that the elastic elements should also be capable of taking up the pressure exerted on the shaving head 4 and thus on the assembly 3 during shaving, i.e. that they should be comparatively rigid. In order to satisfy these contradictory requirements, at least one elastic element, in accordance with the invention, is constituted by a strip-shaped integral which extends transversely to the oscillating movement, which at its one end is connected to the assembly 3 and at its other end to the housing half 1 or 2 respectively. A strip-shaped integral hinge has the property that in the direction perpendicular to the plane of the strip it is highly non-rigid, whereas in directions within the plane of the strip it is very rigid, so that for the previously described arrangement or orientation of said hinge both requirements are met.

In the present example there is provided between the housing and each of the two assembly sides which extend transversely to the oscillating movement, a strip-shaped integral hinge 30 or 31, which extends transversely to the oscillating movement with its longitudinal axis essentially parallel to the direction of the connection between the shaving head and the oscillating-armature motor. These two integral hinges 30 and 31 are connected to the assembly 3 their one end 32 or 33 respectively, engaging with said assembly at that end of the oscillating-armature motor which is remote from the shaving head. For this purpose projections 34 and 35 are formed on the coil former 16, to which said ends of the integral hinges are secured, for example by means of screws; if desired, the coil former and the integral hinges may constitute an integral unit. The other two ends 36 and 37 of the two integral hinges 30 and 31 respectively are connected to the housing, for which purpose there are provided ridges 38 and 39 on the housing half 1, to which said ends of the integral hinges are secured, for example again by means of screws.

In this way the two strip-shaped integral hinges 30 and 31 provide a highly non-rigid spring arrangement for the assembly 3 in the direction of the oscillating movement indicated by the double arrow 11. At the same time the strip-shaped integral hinges—as stated previously—have the property that they are very rigid in all directions which are perpendicular to the former direction, so that in these directions they constitute a satisfactory mounting for the assembly, because they are capable of taking up the pressure exerted on the shaving head during shaving, which pressure essentially acts in the direction of the arrow 40.

Furthermore, between the housing and each of the two confronting sides of the assembly which extend parallel to the oscillating movement there is provided a cylindrical elastic element 41 or 42 respectively, which engages with the end of the oscillating-armature motor which faces the shaving head. For this purpose the spindle 17, on which the oscillating armature 15 is journalled, comprises free ends which in the direction of the housing halves 1 and 2 project from the plate-shaped parts 12 and 13 of the support for the oscillating-armature motor 5 onto each of which one of the cylindrical elastic elements 41 or 42 is slid, for which purpose these elements have corresponding bores. The cylindrical elastic elements 41 and 42 are connected to the housing in such a way that these elements engage with recesses 43 and 44 respectively formed in the housing halves 1 and 2. Such an elastic mounting, the cylindrical elastic elements being constituted by rubber buffers, is known per se.

In this way the two cylindrical elastic elements 41 and 42 assist the two strip-shaped integral hinges 30 and 31 which mainly provide the isolation of vibrations, in the mounting of the assembly 3 in a direction perpendicular to the oscillating movement. This ensures both a satisfactory isolation of vibrations between the assembly and the housing and a reliable mounting of the assembly in the housing. Furthermore, the steps described above enable a simple and compact construction of the dryshaving apparatus. Furthermore, there is provided a dust seal 45 which also consists of a non-rigid elastic element, which toroidally surrounds the plate 23 and which engages with the two housing halves 1 and 2. In the present example this dust seal 45 does not serve for mounting the assembly 3 relative to the housing 1, 2. If desired, such a dust seal may also serve for such mounting purpose, in which case the two cylindrical elastic elements 41 and 42 may be dispensed with.

Obviously, there are other possibilities of arranging or orienting the strip-shaped integral hinges in comprison with the examples described above. As an example the two strip-shaped integral hinges may be arranged in the plane of the cross-section of FIG. 2, the two integral hinges then being arranged on each side adjacent the exciter coil on the coil former 16. However, it is also readily possible to arrange the integral hinges so that in their longitudinal direction they extend substantially perpendicular to the direction of the connection between the shaving head and the oscillating-armature motor, i.e. they are rotated through 90° relative to the arrangement in accordance with FIGS. 1 and 2. In such a case the integral hinges also constitute a highly non-rigid suspension in the direction of the plane of oscillation, whilst in the direction perpendicular to the oscillating movement they are very rigid.

In the example of FIG. 3 the assembly 3 is mounted in the housing half 1 with the aid of four strip-shaped integral hinges 46, 47, 48, 49 only, which also provide isolation of vibrations. Between the housing half 1 and the two confronting sides of the assembly 3 which extend transversely to the oscillating movement there are provided two strip-shaped integral hinges 46, 47 and 48, 49 respectively, which in each case are disposed in one plane and extend with their longitudinal axes substantially parallel to the direction of the connection between the shaving head 4 and the oscillating armature motor 5. Each of the two integral hinges 46, 47 and 48, 49, which are respectively disposed in one plane, is connected to the housing half 1 at ends 50, 51 and 52, 53 of the two respective integral hinges, which are remote from each other, their two facing ends 54, 55 and 56, 57 respectively serving for the connection to the assembly 3, so that such integral hinges are oppositely oriented in pairs relative to the direction of the connection between the shaving head and the oscillating-armature motor. The choice of the points of connection to the housing and to the assembly 3 may also be reversed, depending on the relevant constructional details. In the present case care must be taken that the points of connection of the integral hinges 46, 47, and 48, 49, which respectively disposed in one plane, to the assembly 3 are spaced at a certain distance from each other in order to ensure a reliable mounting of the assembly 3. In the present example these connection points are therefore arranged on the confronting flanges 58, 59 and 60, 61 of coil formers 64 and 65 respectively, which carry an exciter coil 62 and 63 respectively associated with one of the two limbs of the stator 14 of the oscillating-armature motor 5. For this purpose corresponding projections 66, 67 and 68, 69 are formed on these flanges, to which the relevant ends 54, 55 and 56, 57 of the integral hinges are secured, for example again by means of screws. The other ends 50, 51 and 52, 53 of the integral hinges are connected to the housing half 1 by plugged connections which are obtained by making the relevant ends of the integral hinges T-shaped, which ends engage with corresponding sockets 70, 71, 72 and 73 on the housing half 1 and the second housing half, not shown.

In this way a particularly non-rigid resilient suspension of the assembly 3 in the direction of the oscillating movement and thus a very satisfactory isolation of vibrations are achieved. As a result of the rigidity of strip-shaped integral hinges in the direction perpendicular to the oscillating movement these integral hinges are again capable of taking up the pressure on the shaving head which occurs during shaving and thus of ensuring an exact mounting of the assembly 3 in the housing 1.

It is obvious that other arrangements and orientations of the strip-shaped integral hinges are possible which differ from the present examples. As an example, the connection points of the four integral hinges to the assembly may be selected so that each time two integral hinges diametrically oppose each other, spatially offset in the direction of the spindle 17. Of course, it is also possible to connect the integral hinges to other parts of said assembly than the coil formers.

What is claimed is:

1. A dryshaving apparatus which comprises a housing; a shaving head including a stationary upper cutter and a cooperating lower cutter; an oscillating armature motor for driving the lower cutter in a reciprocatory oscillating movement, the shaving head and the oscillating-armature motor being connected and constituting an assembly; and means to mount the assembly in the housing by elastic elements only, at least one of the elastic elements being a strip-shaped integral hinge extending transversely to the oscillating movement, said integral hinge being connected at one end to the assembly and at its other end to the housing, the assembly together with the elastic elements having a mechanical resonant frequency less than the oscillation frequency, divided by $\sqrt{2}$, of the parts of the assembly performing the reciprocatory oscillating movement.

2. A dryshaving apparatus according to claim 1, in which between the housing and each of the two confronting sides of the assembly extending transversely to the oscillating movement there is at least one strip-shaped integral hinge connected at the end engaging the assembly to that end of the oscillating-armature motor remote from the shaving head, and in which between the housing and each of the two confronting sides of the assembly extending parallel to the oscillating movement there is a cylindrical elastic element engaging that end of the oscillating-armature motor facing the shaving head.

3. A dryshaving apparatus according to claim 2, in which between the housing and each of the two confronting sides of the assembly extending transversely to the oscillating movement there is only one strip-shaped integral hinge, the longitudinal axis of said integral hinge extending essentially parallel to the direction of the connection between the shaving head and the oscillating-armature motor.

4. A dryshaving apparatus according to claim 1, in which between the housing and each of the two confronting sides of the assembly extending transversely to the oscillating movement there are at least two strip-shaped integral hinges arranged with their longitudinal axes extending essentially parallel to the direction of the connection between the shaving head and the oscillating-armature motor and oriented oppositely to each other relative to said direction.

5. A dryshaving apparatus according to claim 1, in which at its end engaging the assembly the strip-shaped integral hinge is connected to a coil former provided with an exciter coil for the oscillating-armature motor.

* * * * *